US006031464A

United States Patent [19]

Matsumoto et al.

[11] Patent Number: 6,031,464

[45] Date of Patent: Feb. 29, 2000

[54] SECURITY SYSTEM BASED ON CERTIFICATION

[75] Inventors: Tsutomu Matsumoto, 2603-1-210 Kamitsuruma, Sagamihara-shi, Kanagawa-ken; Hiroyuki Matsumoto; Masatake Ohno, both of Kanagawa-ken, all of Japan

[73] Assignees: Tsutomu Matsumoto; NHK Spring Co., Ltd, both of Kanagawa-ken, Japan

[21] Appl. No.: 08/853,523

[22] Filed: May 9, 1997

[30] Foreign Application Priority Data

May 8, 1996 [JP] Japan .................................... 8-137580

[51] Int. Cl.[7] ........................................................ G06K 5/00

[52] U.S. Cl. ................................ 340/825.31; 340/825.34; 235/379; 235/380; 382/115

[58] Field of Search ......................... 340/825.31, 825.34; 382/115; 235/449, 380, 382, 382.5, 379

[56] References Cited

U.S. PATENT DOCUMENTS

| | | | |
|---|---|---|---|
| 4,213,038 | 7/1980 | Silverman et al. | 235/382 |
| 4,218,674 | 8/1980 | Brosow et al. | 340/149 |
| 4,734,695 | 3/1988 | Goldman | 340/825.34 |
| 5,073,950 | 12/1991 | Colbert et al. | 382/2 |
| 5,170,466 | 12/1992 | Rogan et al. | 395/145 |
| 5,343,529 | 8/1994 | Goldfine et al. | 380/23 |
| 5,719,939 | 2/1998 | Tel | 380/23 |

FOREIGN PATENT DOCUMENTS 6-168363 6/1994 Japan .

*Primary Examiner*—Jacques H. Louis-Jacques
*Assistant Examiner*—Yonel Beaulieu
*Attorney, Agent, or Firm*—Skjerven, Morrill, MacPherson, Franklin & Friel LLP

[57] ABSTRACT

The data containing reference data is transformed into signature data by a method which depends on a variable generated by the reference data, and the identification data is certified by inverse transformation of the signature data. The signature generating rule changes in dependence on the reference data, and it is therefore extremely difficult to analyze the signature generating rule from the medium or the card reader/writer so that the forgery or modification of magnetic or other data, which is otherwise easy to duplicate, can be made extremely difficult. Therefore, even when a reader is illicitly obtained, and analyzed, it is extremely difficult to estimate the signature generating rule as it owes to the difficulty of solving a set of multivariate simultaneous equations.

20 Claims, 6 Drawing Sheets

SECURITY SYSTEM BASED ON CERTIFICATION

TECHNICAL FIELD

The present invention relates to a security system for preventing forgery and duplication of an object, such as a prepaid card, a credit card and an ID card, whose authenticity is required to be determined.

BACKGROUND OF THE INVENTION

As a means for preventing forgery or illicit duplication of an object, it has been proposed, for instance, to record a unique physical property of the object as data in advance, and to match the recorded data with the actual physical property of the object when the authenticity of the object is required to be verified. However, this cannot totally prevent an illicit duplication of the object by analyzing the physical property and duplicating the physical property.

According to a conventional security system, signature data is generated from original data by using a signature generating rule, and the authenticity of the original data is determined by verifying the signature data by using a signature verifying rule. The person who knows the signature verifying rule can verify the authenticity of the original data by verifying the signature data. Also, only the person who knows the signature generating rule can create his own signatured data, and change it. Because this system allows the authenticity of the data to be determined in an effective manner, there have been some attempts to affix a recording medium of the data in the form of a seal onto an object as a proof of the authenticity of the object.

However, even this system cannot totally prevent an attempt to forge the data by illicitly obtaining samples of signatured data and original data, and analyzing the data so as to decipher the signature generating rule and newly create signatured data.

BRIEF SUMMARY OF THE INVENTION

In view of such problems of the prior art, a primary object of the present invention is to provide a highly secure security system which can effectively prevent any forgery and duplication of an object.

A second object of the present invention is to provide a security system which is highly secure against any attempt to break it but which does not require a large number of data bits for its implementation.

A third object of the present invention is to provide a highly secure security system which does not require any large processing load.

A fourth object of the present invention is to provide a highly secure security system which can be economically implemented.

According to the present invention, such objects can be accomplished by providing a security system for preventing forgery or duplication of an object whose authenticity is required to be determined, comprising, in one embodiment: a reference region affixed to an object, the reference region including a physical marking which is machine readable and is so randomly formed as to prevent any duplication thereof; an identification data storage region for retaining identification data which is based on reference data read from the reference region; and a signature data storage region for storing signature data for certifying the identification data; wherein the signature data is generated from the reference data and/or the identification data; and the authenticity of the object is determined according to a result of comparing the reference data read from the reference region with the reference data contained in the identification data and/or the signature data, and a result of certifying the identification data with the signature data, or, in another embodiment by providing a security system for preventing forgery or duplication of an object whose authenticity is required to be determined, comprising: an identification data storage region for retaining identification data which is associated with a reference data, the reference data being individually assigned when writing the identification data into the identification data storage region; and a signature data storage region for storing signature data for certifying the identification data; wherein the signature data is generated by transforming data including the identification data and/or the reference data by using a variable which is generated from the identification data and/or the reference data; and wherein the authenticity of the object is determined according to a result of certifying the identification data with data generated by inverse transformation of the signature data in a manner which corresponds to a variable generated from the identification data and/or the reference data.

The authenticity of the identification data stored in the identification data storage region is determined according to the reference data which is either arbitrarily selected or machine readable from a reference region, the reference region being formed so as to be difficult to be synthetically reproduced, and the identification data which is to be matched with the reference data, and alternatively, solely by the signature data which is generated by a process dictated by the variable generated from the reference data. Therefore, even when a plurality of samples are made available, because the signature generating rule is different from one sample to another, analysis of the signature generating rule is extremely difficult, and without the knowledge of the signature generating rule for each sample, it is also difficult to newly create the signatured data or to modify it. Even when the signatured data is simply duplicated, because the reference data may vary from one object to another, its authenticity can be readily disproved, and any attempt to attach duplicated signature data to an illicit object and pass off the illicit object for an authentic object can be readily detected.

In particular, when the authenticity of the object is determined according to a result of matching the data read from the reference region during the course of the determination process with the reference data included in the identification data or the signature data, and a result of certifying the identification data, it is possible to detect an attempt to copy the entire object carrying the signatured data because the level of agreement between the data read from the identification region during the course of the determination process with the reference data is low. In other words, the present invention can also effectively prevent simple copying of one object to another for illicit purpose.

Further, when the identification data consists of a combination of administrative data for managing the object and the reference data, it is possible to even more effectively prevent any illicit attempt to newly create signature data or to modify the data by separately comparing the administrative data with information associated with the object and the party which generated the signature.

When the signature data is generated from a compressed identification data obtained by data compressing the identification data, it is possible to reduce the bit length which is required to be processed, and to thereby reduce the time required for the signature verification.

The reference region may be formed by randomly placing magnetic fibers in paper or synthetic resin material or by utilizing an unevenness in paper, surface irregularities of sheet material or other machine readable but synthetically unreproduceable region. Such technologies are disclosed in U.S. Pat. Nos. 4,218,674 and 4,734,695, and Japanese patent laid-open publication (kokai) No. 6-168363. The contents of these prior patents are hereby incorporated in this application by reference.

BRIEF DESCRIPTION OF THE DRAWINGS

Now the present invention is described in the following with reference to the appended drawings, in which.

DETAILED DESCRIPTION OF THE PREFERRED EMBODIMENTS

Figure 1:
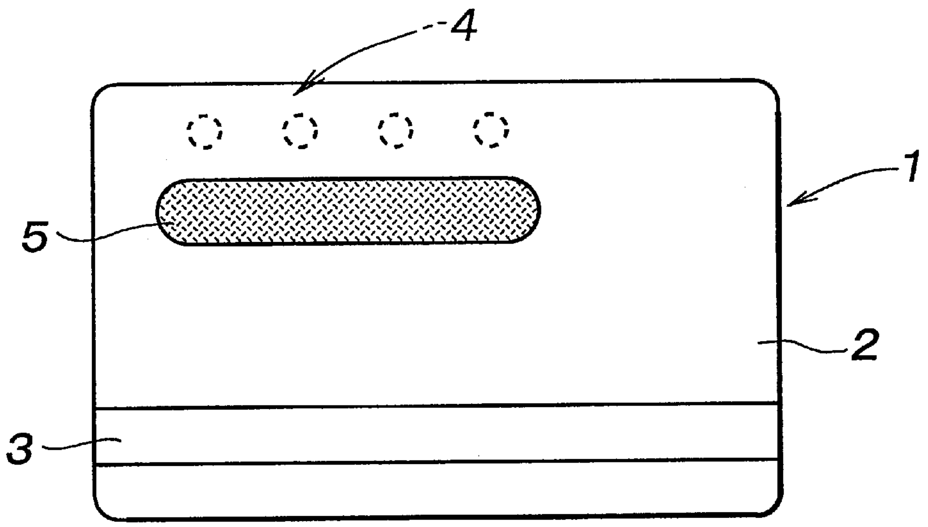
FIG. 1 is a front view of a prepaid card which is given as an exemplary object to which the present invention is applied.

FIG. 1 shows a prepaid card to which the present invention is applied. This card 1 consists of a polyester sheet 2, and carries thereon a magnetic stripe 3 which includes a storage region for storing identification data, the identification data being generated by combining administrative data, which specifies the issuing party, the kind of the card and the purpose of the card, with reference data which is described hereinafter, a perforation region 4 which is perforated as the card is spent, and a reference region 5 which is formed by randomly dispersing magnetic fibers in the resin material of the base sheet 2. The magnetic stripe 3 further includes a signature data storage region which is described hereinafter.

Figure 2:
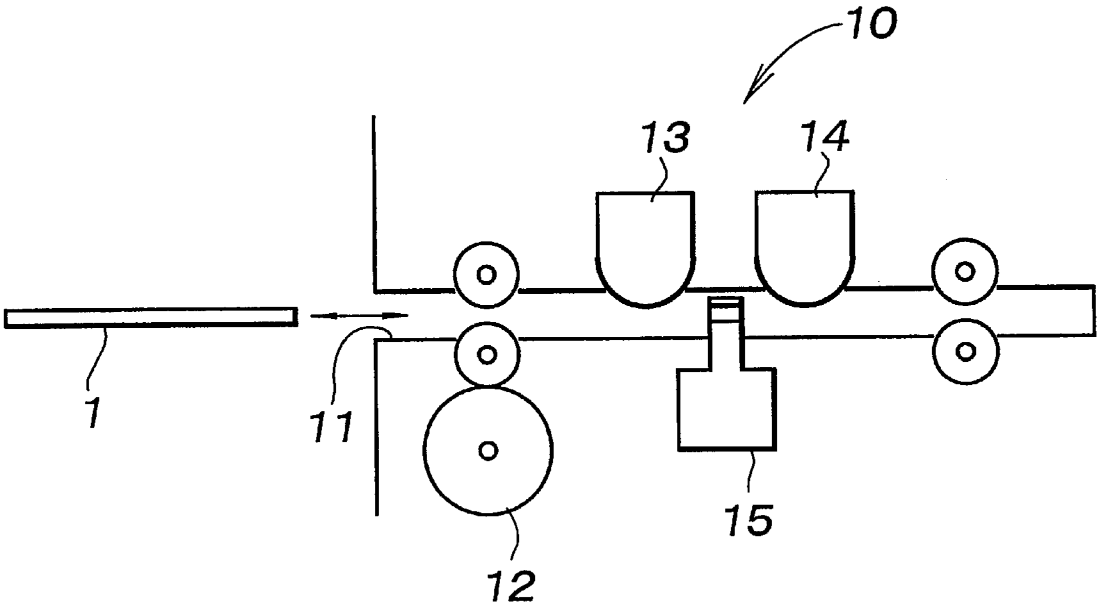
FIG. 2 is a diagram showing an example of the card reader for the prepaid card.

FIG. 2 shows a card reader to which the present invention is applied. The card reader 10 is incorporated with a card conveying unit 12 which includes motor-actuated rollers for taking a card into a slot 11, and ejecting the card 1 therefrom after the data is read. Along the length of the slot 11 are provided a magnetic head 13 for reading data from the magnetic stripe 3 and an induction magnetic head 14 for reading data from the reference region 5. Numeral 15 denotes a perforation unit for perforating the perforation region 4 of the card 1 to indicate how far the card is spent, and to destroy the reference region 5 as required.

The procedure for generating signature data in the card 1 or the procedure for preparing the card is described in the following with reference to FIG. 3. First of all, a signal is read from the reference region 5 along a reading path defined by the card reader as reference data F, and it is combined with the administrative data A. The combined data is written into an identification data storage region of the magnetic stripe 3 as identification data M consisting of four 64-bit data blocks m1 to m4. Then, a hashing process as indicated in FIG. 4 is applied to the identification data M. More specifically, data block m1 is combined with fixed 64-bit data blocks h0 and h0' to generate a pair of 64-bit data blocks h1 and h1'. Data block m2 is combined with the fixed data blocks h1 and h1' to generate a pair of 64-bit data blocks h2 and h2'. This process is repeated four times until a pair of 64-bit data blocks h4 and h4' are obtained. The finally obtained hashed data D has a 128-bit data length.

Figure 3:
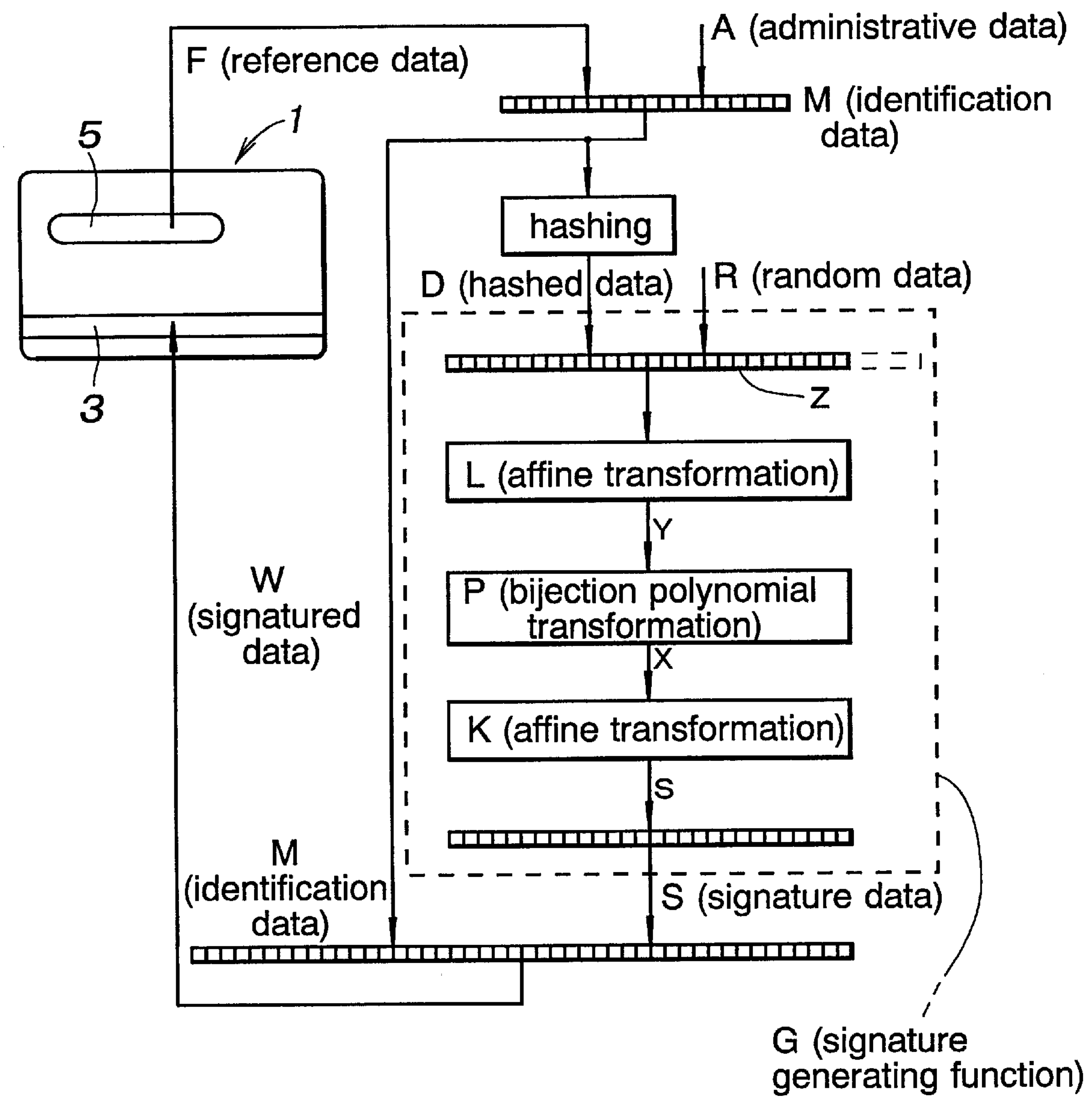
FIG. 3 is a block diagram showing the procedure for making a card according to a first embodiment of the present invention.
Figure 4:
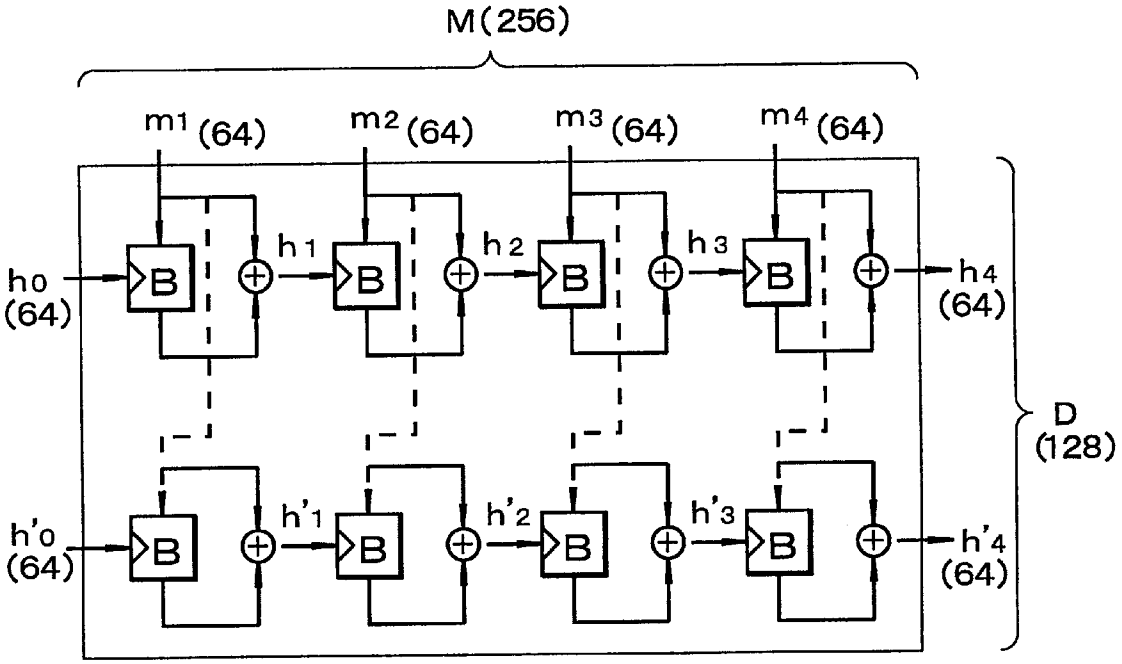
FIG. 4 is a block diagram showing the details of the hashing process shown in FIG. 3.

The hashed data D is combined with prescribed random data R as indicated in FIG. 3 to generate input data Z having a bit length of 100 bits for instance, which is matched with the signature data to be written. An affine transformation L, a bijection polynomial transformation P, and an affine transformation K are successively carried out on the hashed data Z ($Z \rightarrow Y \rightarrow X \rightarrow S$) or, in other words, an arithmetic operation based on a signature generating function G is carried out to obtain final signature data S. The signature data S and the aforementioned identification data M are then written into the corresponding storage regions of the magnetic stripe 3. It is understood that the data which is written into the magnetic stripe is called as signatured data W. The signature data storage region and the identification storage region may be arranged separately from each other, but may store the data after it is ciphered and combined with each other by suitable ciphering means not shown in the drawings.

The bijection polynomial transformation P transforms an arbitrary element Y of a finite field into a certain element X, and the difficulty in analyzing the signature generating rule owes to the difficulty in solving a set of multivariate simultaneous equations. To further increase the difficulty in estimating signature generating function G from signature verifying function V which is described hereinafter, an affine transformation is carried out before and after the bijection polynomial transformation. The constants h0 and h0' for the hashing process may consist of arbitrary constants.

Arbitrary constants may also be selected for the affine transformations L and K and the bijection polynomial transformation P which are applied to the signature generating function G, but in the present embodiment, these constants are selected and modified according to a unique variable generated from the reference data F. Because the constants h0 and h0' as well as the constants for the affine transformations L and K and the bijection polynomial transformation P associated with the signature generating function can be arbitrarily selected, it is possible to define a certification system in any one of a large number of possible ways, and the signature generating rule can be made harder to estimate all the more. In particular, by intervening random data in the process of signature generation, the estimation of the signature generating data can be made even more difficult in an effective manner.

Figure 5:
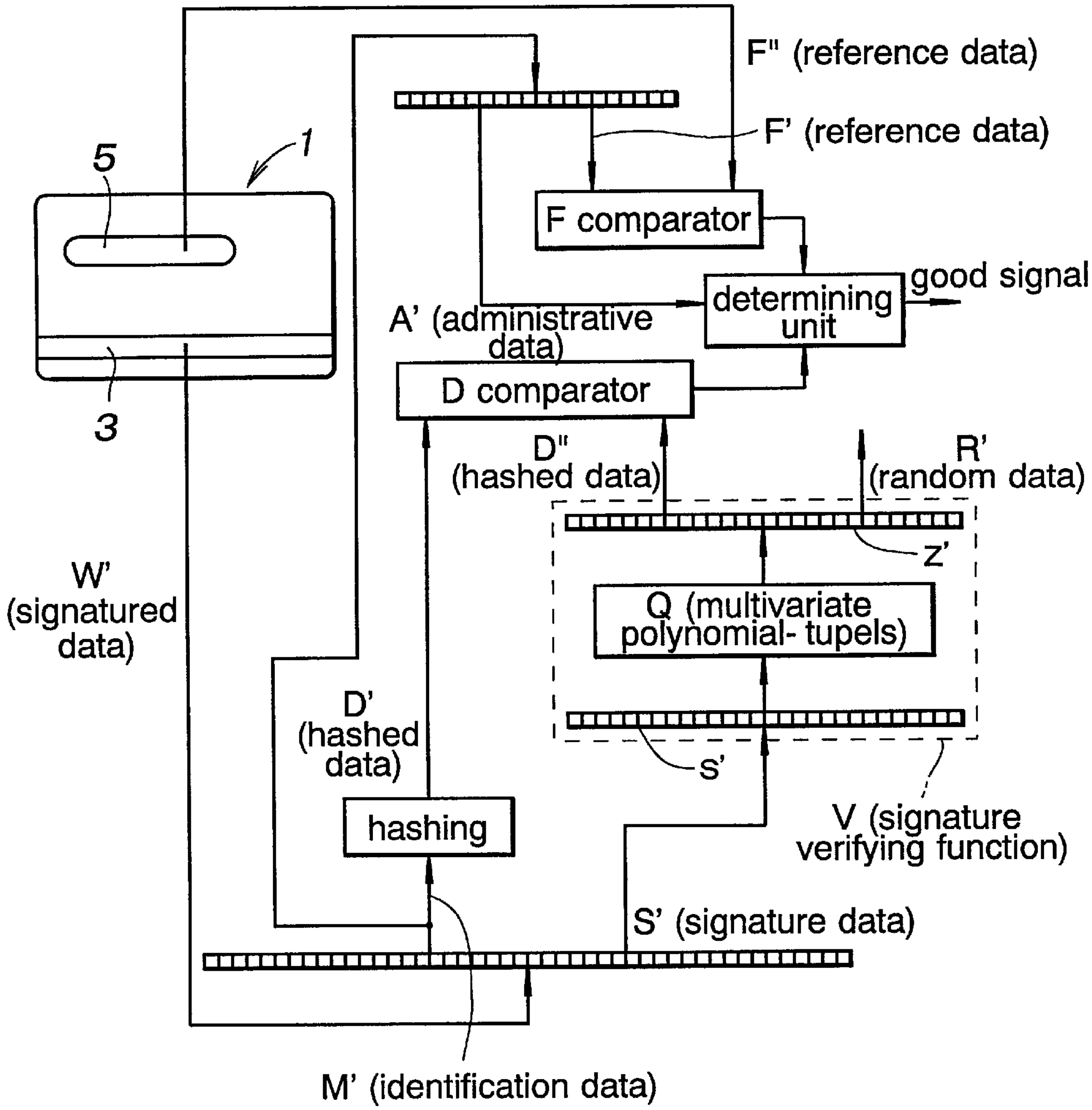
FIG. 5 is a block diagram showing the procedure for certifying and reading a card according to the first embodiment of the present invention.

When this card 1 is to be used, as shown in FIG. 5, first of all, the identification data M' in the signatured data W' is hashed in a similar fashion to produce hashed data D'. At the same time, the signature data S' in the signatured data W' is inverse transformed by a multivariate polynomial-tuples (reverse of the $Z \rightarrow Y \rightarrow X \rightarrow S$ transformation) or, in other words, by an arithmetic operation using a signature verifying function V. The data obtained by the inverse transformation using the multivariate polynomial-tuples is separated into hashed data D" and random data R'. The signature is then verified by comparing the two sets of hashed data D' and D" to determine the authenticity of the original data.

At the same time, the identification data M' is separated into reference data F' and administrative data A'. The reference data F' is compared with the reference data F" obtained from the identification region by the induction magnetic head 14, and the authenticity of the card is determined. Data is verified by this signature verifying process. Only when the results of comparison between the two sets of hashed data D' and D" and between the two sets of reference data F' and F" are both satisfactory or only when the authenticity of the card is determined, a good signal is produced from the determining unit, and a prescribed service for each particular application is offered. It is also possible to produce a good signal when the administrative data A' matches with the administrative data A which was initially stored in means not shown in the drawings.

Because the duplication of the reference region is practically impossible, the duplication of the entire card can be avoided. The reference data F" which is read by the induction magnetic head 14 from the reference region can vary every time it is read because some positional errors are inevitable when conveying and stopping the card, the card may be soiled in different levels, and the magnetic state of the reference region normally changes with time. Therefore, in reality, the authenticity of the card may be verified when an agreement better than a certain tolerance level is established, instead of requiring an exact agreement. For instance, when an attempt is made to extract the reference data F' from the identification data M' stored as magnetic data, and read the reference data F" from the reference region 5 to compare them and analyze the relationship between them for illicit purpose, because the reference data F" changes every time it is read, it is quite impossible to analyze the relationship between the two sets of reference data F' and F" even when a number of samples are obtained. Thus, it is virtually impossible to make a card having an arbitrarily selected reference region, and to fabricate identification data M' which corresponds to the reference data obtained from the reference region. Furthermore, as it is extremely difficult to generate signature data from the identification data as mentioned above, modification of the data is also extremely difficult. Thus, copying of the entire card (article), forging (duplication) of the card, modification of data are all extremely difficult to carry out so that any illicit attempt on the object can be effectively prevented.

Figure 6:
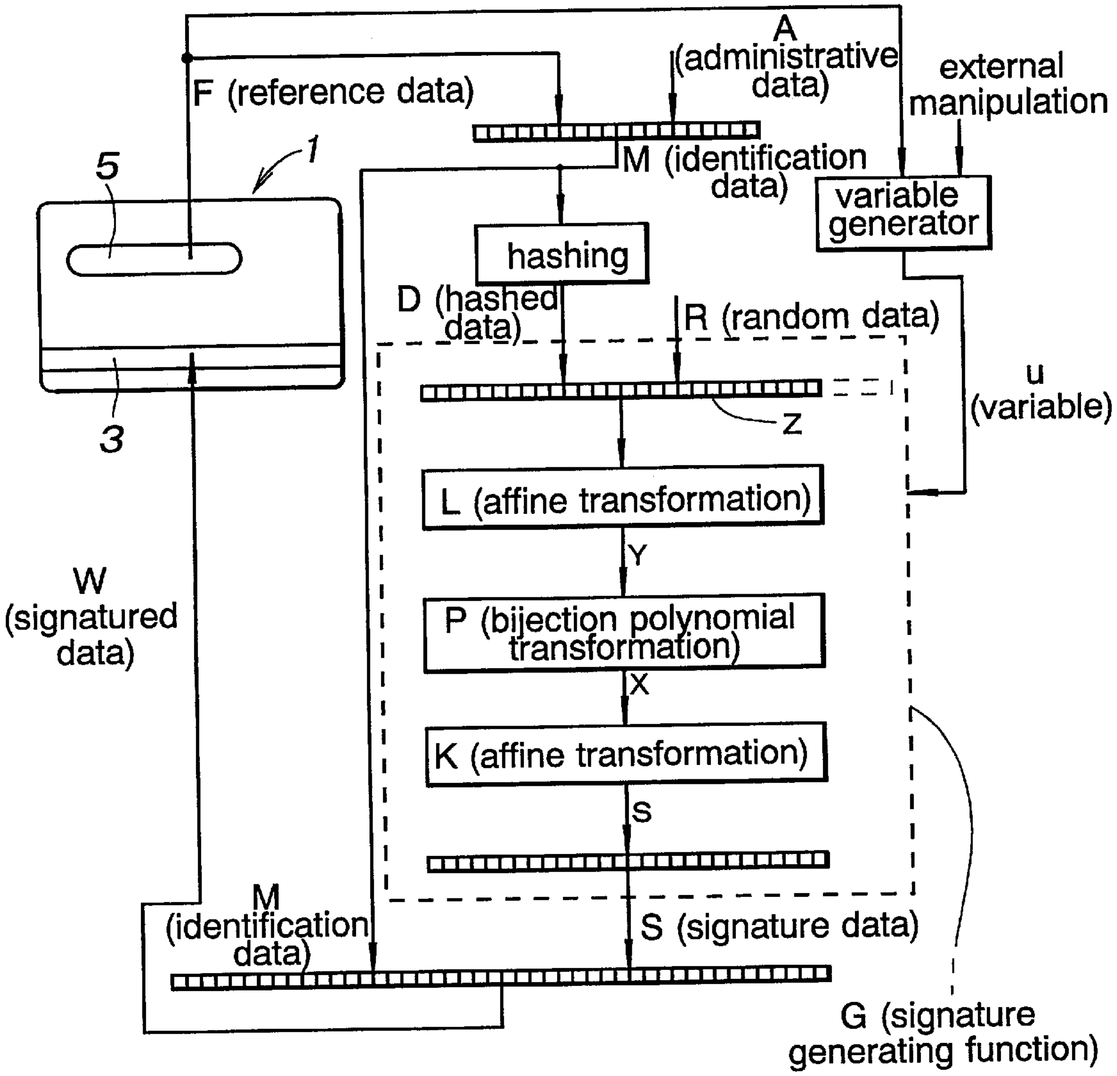
FIG. 6 is a view similar to FIG. 3 showing the procedure for making a card according to a second embodiment of the present invention.

FIG. 6 is a view similar to FIG. 3 showing a second embodiment of the present invention. The basic structures of the prepaid card and the card reader are similar to those of the previous embodiment.

Referring to FIG. 6, when making a card, first of all, a signal is read from the reference region 5 along a reading path defined by using a machine such as the card reader as reference data F, which is then combined with the administrative data A. The combined data is written into an identification data storage region of the magnetic stripe 3 as identification data M consisting of four 64-bit data blocks m1 to m4. Then, a hashing process such as the one described earlier with reference to FIG. 4 is applied to the identification data M. This finally results in hashed data D which is 128-bit long.

The hashed data D is combined with prescribed random data R as indicated in FIG. 6 to generate input data Z having a bit length of 100 bits for instance, which is matched with the signature data to be written. An affine transformation L, a bijection polynomial transformation P, and an affine transformation K are successively carried out on the hashed data Z (Z→Y→X→S) or, in other words, an arithmetic operation based on a signature generating function G is carried out to obtain final signature data S. The signature data S and the aforementioned identification data M are then written into the corresponding storage regions of the magnetic stripe 3. It is understood that the data which is written into the magnetic stripe is called as signatured data W. The signature data storage region and the identification storage region may be arranged separately from each other, but may store the data after it is ciphered and combined with each other by suitable ciphering means not shown in the drawings.

The bijection polynomial transformation P transforms an arbitrary element Y of a finite field into a certain element X, and the difficulty in analyzing the signature generating rule owes to the difficulty in solving a set of multivariate simultaneous equations. To further increase the difficulty in estimating signature generating function G from signature verifying function V, an affine transformation is carried out before and after the bijection polynomial transformation. The constants h0 and h0' for the hashing process may consist of arbitrary constants.

Arbitrary constants may also be selected for the affine transformations L and K and the bisection polynomial transformation P which are applied to the signature generating function G, but in the present embodiment, these constants are selected and modified according to a unique variable u generated from the reference data F. This may be accomplished by looking up the constant in a table defining a relationship between the variable u and the constants. It is also possible to define a function which generates the constants from the selected variable. In practice, it is also possible to change the transformation algorithm itself for the bijection polynomial transformation P according to the variable u. It is thus possible to form a highly adaptable certification system and to make the estimation of the signature generating rule extremely difficult. In particular, by intervening random data in the process of signature generation, the estimation of the signature generating data can be made even more difficult in an effective manner.

Figure 7:
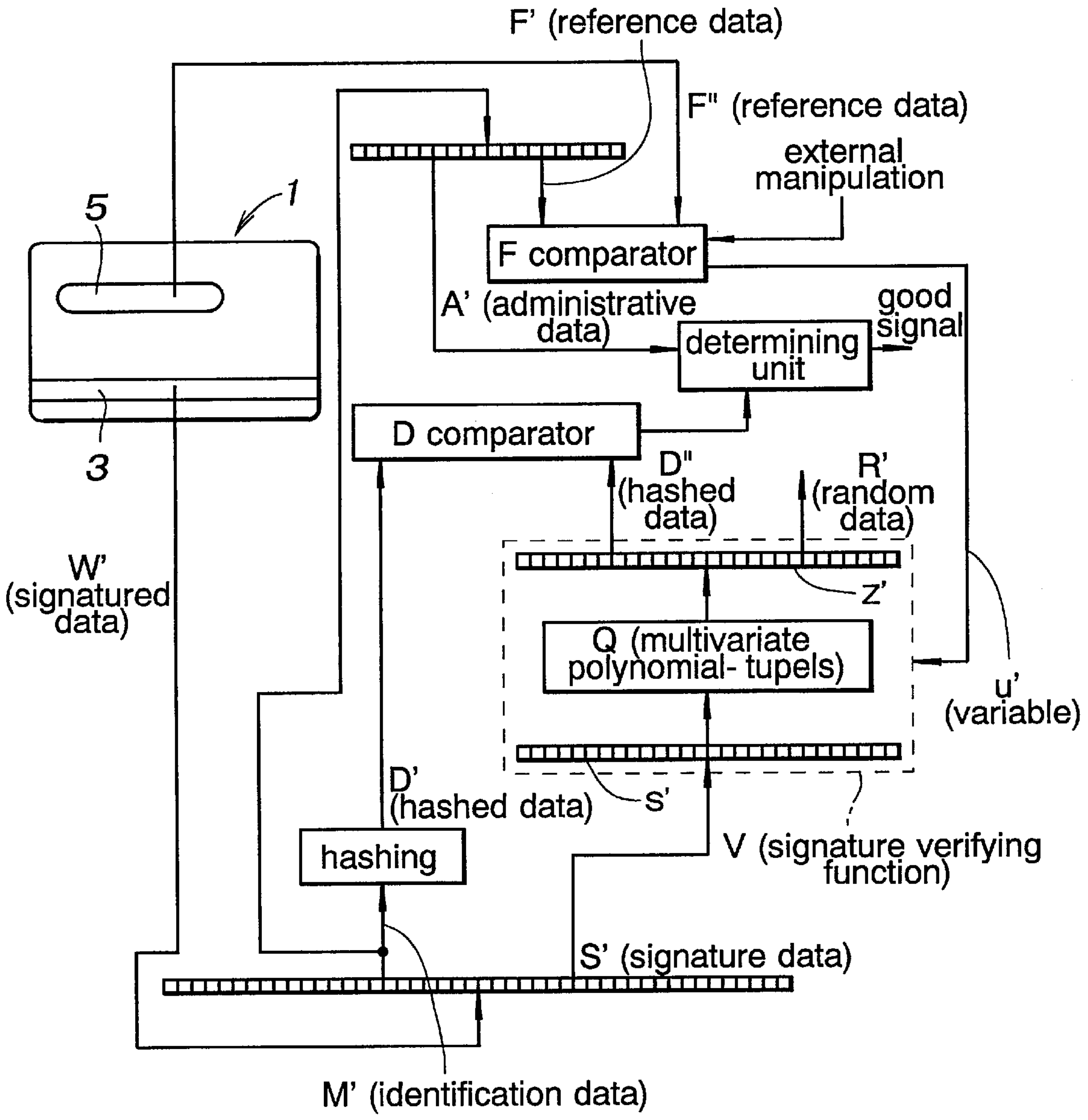
FIG. 7 is a view similar to FIG. 5 showing the procedure for certifying and reading a card according to the second embodiment of the present invention.

When this card 1 is to be used, as shown in FIG. 7, first of all, the identification data M' in the signatured data W' is separated into reference data F' and administrative data A'. The reference data F' is compared with reference data F" obtained by the induction magnetic head 14 from the reference region 5 to verify the authenticity of the card 1. When the authenticity of the card is verified, the hashing process is applied to the identification data M' in a similar manner to produce hashed data D'. At the same time, the signature data S' in the signatured data W' is inverse transformed by a multivariate polynomial-tuples (reverse of the Z→Y→X→S transformation) or, in other words, by an arithmetic operation using a signature verifying function V. At this point, variable u' is generated from the reference data F' in a similar fashion to obtain the constant for the multivariate polynomial-tuples or the inverse transformation algorithm. The data obtained by the inverse transformation using the multivariate polynomial-tuples is separated into hashed data D" and random data R'. The signature is then verified by comparing the two sets of hashed data D' and D" to determine the authenticity of the original data. Only when the verification process is completed in a normal manner or the authenticity of the card is verified, a good signal is produced from the determining unit to permit offering of services for each particular application. It is also possible to produce a good signal when the administrative data A' matches with the administrative data A which was initially stored in means not shown in the drawings.

The reference region 5 was formed by randomly dispersing magnetic fibers in the resin material of the base sheet 2 in the above described second embodiment, but it is also possible to simply form a bar code for recording the variable u. If the cycle of recording and reading is conducted in a relatively short period of time, it is also possible to set reference data on the reader/writer, instead of forming a reference region on the object, and change the reference data either regularly or irregularly.

It is also possible to allow the relationship between the variable u and the constants to be manipulated from outside as illustrated in FIGS. 6 and 7. For instance, the table for associating the variable u with the constants or the mathematical function for generating the constants from the variable u may be adapted to be modified from outside. The same is true with the arrangement for changing the transformation algorithm of the bijection polynomial transformation itself according to the variable u.

The object consisted of an information storage card or an ID card in the above described embodiments, but it is obvious for a person skilled in the art that the present invention can be applied to jewelry, security notes, and keys to rooms and vehicles which have known values, and are required to be verified of their authenticity.

Thus, according to the present invention, a highly complex certification system can be achieved by using signature data consisting of a relatively small bit length. Furthermore, the processing time required for signature generation and signature verification is not increased, and the sizes of the program and the memory required for executing the algorithm are no more than what can be readily incorporated in a conventional card reader/writer without any problem.

In particular when the identification data is matched with the reference data read from a region which cannot be easily reproduced or duplicated, it is extremely difficult to illicitly duplicate the object such as an information storage card. Also, it is extremely difficult to analyze the system from a number of samples of the object.

It is also difficult to analyze the signature generating rule from the card or the card reader. In other words, even when a card reader is obtained, and is analyzed, it still is extremely difficult to estimate the signature generating rule because the difficulty owes to the difficulty in solving a set of multivariate simultaneous equations.

The data containing the reference data is transformed into the signature data by a method which depends on a variable generated by the reference data, and the identification data is certified by inverse transformation of the signature data. The signature generating rule changes in dependence on the reference data (or a variable generated thereby), and it is therefore extremely difficult to analyze the signature generating rule from the medium (object) or the card reader/writer so that the forgery or modification of the magnetic data, which is otherwise easy to duplicate, can be made extremely difficult. Therefore, even when a reader (signature verifier) is illicitly obtained, and analyzed, it is extremely difficult to estimate the signature generating rule as it owes to the difficulty of solving a set of multivariate simultaneous equations. Furthermore, because the signature generating rule changes for each particular reference data (for instance, if the object has its own unique reference data, the signature generating rule changes for each object), the analysis of the reference data is so difficult that any attempt to generate or modify signatured data can be effectively prevented.

Furthermore, by using reference data which is obtained from a non-reproduceable reference region, and requiring the matching between the reference data read from the reference region with the signatured identification data when determining the authenticity of the article, any illicit attempt to duplicate the object or the card will be made extremely difficult. Likewise, analyzing the system from a plurality of card samples is also extremely difficult to accomplish.

Although the present invention has been described in terms of preferred embodiments thereof, it is obvious to a person skilled in the art that various alterations and modifications are possible without departing from the scope of the present invention which is set forth in the appended claims.

What we claim is:

1. A security system for preventing forgery or duplication of an object whose authenticity is required to be determined, comprising:

an identification data storage region for retaining identification data which is associated with a reference data, said reference data being individually assigned when writing said identification data into said identification data storage region; and a signature data storage region for storing signature data for certifying said identification data;

wherein said signature data is generated by transforming data including said identification data and/or said reference data by using a first variable which is generated from said identification data and/or said reference data; and the authenticity of said object is determined according to a result of certifying said identification data with data generated by inverse transformation of said signature data in a manner which corresponds to a second variable generated from said identification data and/or said reference data.

2. A security system based on certification according to claim 1, wherein said reference data is generated by reading data from a reference region which is affixed to said object and is machine readable, said identification region being formed in such a physically random fashion as to make any duplication of said identification region extremely difficult.

3. A security system based on certification according to claim 1, wherein the authenticity of said object is determined according to a result of matching said reference data read from said reference region during the course of an authenticity determination process with said reference data included in said identification data and/or said signature data, and a result of certifying said identification data with said data generated by inverse transformation of said signature data in a manner which corresponds to a second variable generated from said identification data and/or said reference data.

4. A security system based on certification according to claim 1, wherein said identification data consists of a combination of administrative data for managing said object and said reference data.

5. A security system based on certification according to claim 1, wherein said signature data is generated from a compressed identification data obtained by data compressing said identification data.

6. A security system based on certification according to claim 1, wherein said reference region is formed by randomly placing magnetic fibers in paper or synthetic resin material.

7. A security system based on certification according to claim 1, wherein said first variable is related to a constant of said transformation.

8. A security system based on certification according to claim 1, wherein said first variable is related to an algorithm for said transformation.

9. A security system based on certification according to claim 1, wherein said transformation comprises a bijection polynomial transformation.

10. A security system based on certification according to claim 1, wherein said transformation further comprises an affine transformation.

11. A method for authenticating an object, comprising:

affixing a reference data region to said object, said reference data region comprising a randomly formed physical marking that is difficult to duplicate and which is machine readable to generate unique reference data associated with said object;

reading the reference data region to generate the reference data associated with said object;

associating administrative data with said object, the administrative data including data relating to the provenance of said object;

combining the reference data and the administrative data to generate unique identification data associated with said object;

writing the identification data in a machine readable identification data storage region on said object;

hashing the identification data with an arbitrary constant to generate hashed identification data;

generating unique signature data associated with said object, comprising:

combining the hashed identification data with random data to generate input data;

selecting at least one constant;

operating on the input data with the at least one constant and a signature generating function to generate the signature data, the signature generating function comprising at least one bijection polynomial transformation; and, writing the signature data generated in a machine readable signature data storage region on said object.

12. The method of claim 11, wherein the signature generating function further comprises at least one affine transformation.

13. The method of claim 11, wherein generating the signature data further comprises generating a unique variable from the reference data, and wherein selecting the at least one constant comprises deriving the constant from the generated variable.

14. The method of claim 11, wherein the administrative data associated with said object is stored remotely from said object as original administrative data, and further comprising:

reading the identification data from the identification data region on said object;

separating the administrative data from the identification data read;

retrieving the remotely stored original administrative data associated with said object; and, authenticating said object by comparing the administrative data read from said object with the retrieved original administrative data.

15. The method of claim 11, further comprising:

reading the identification data from the identification data storage region on said object;

separating the reference data from the identification data read;

reading the reference data from the reference data region on said object;

hashing the identification data read with an arbitrary constant to generate hashed identification data;

reading the signature data from the signature data storage region on said object;

inversely transforming the signature data read with a signature verifying function to generate hashed data combined with random data, the signature verifying function comprising at least one multivariate polynomial-tuple transformation;

separating the hashed data from the random data; and, authenticating said object by comparing the reference data separated from the identification data with the reference data read from the reference data region on said object, and by comparing the hashed identification data with the hashed data separated from the random data, respectively.

16. The method of claim 15 wherein inversely transforming the signature data with a signature verifying function further comprises:

generating a unique variable from the reference data read from the reference data region on said object;

deriving at least one constant from the generated variable; and, operating on the signature data with the at least one constant and the at least one multivariate polynomial-tuple to generate the hashed data.

17. The method of claim 13, wherein deriving the at least one constant from the generated variable comprises looking up the constant in a table defining a relationship between the variable and the constant.

18. The method of claim 11, further comprising compressing the identification data before hashing it.

19. The method of claim 11, wherein affixing a reference data region to said object comprises randomly distributing a plurality of magnetic fibers in a matrix of non-magnetic material and attaching the matrix to said object.

20. The method of claim 15, further comprising generating a "good" signal when said object is determined to be authentic.

* * * * *

UNITED STATES PATENT AND TRADEMARK OFFICE
CERTIFICATE OF CORRECTION

PATENT NO. : 6,031,464
ISSUE DATE : February 29, 2000
SERIAL NO. : 08/853,523
INVENTOR(S) : Matsumoto, Tsutomu; Matsumoto, Hiroyuki; Ohno, Masatake It is certified that error appears in the above-identified patent and that said Letters Patent is hereby corrected as shown below:

Cover page of the patent, line 22, delete "May 9, 1997" and insert --May 8, 1997--.

Signed and Sealed this

Eighth Day of May, 2001

*Attest:*

*Nicholas P. Godici*

NICHOLAS P. GODICI

*Attesting Officer* *Acting Director of the United States Patent and Trademark Office*